(12) United States Patent
Hashimoto et al.

(10) Patent No.: US 11,466,647 B2
(45) Date of Patent: Oct. 11, 2022

(54) FUEL REFORM APPARATUS

(71) Applicant: Honda Motor Co., Ltd., Tokyo (JP)

(72) Inventors: Kohtaro Hashimoto, Wako (JP); Tomohide Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/577,176

(22) Filed: Jan. 17, 2022

(65) Prior Publication Data

US 2022/0235729 A1 Jul. 28, 2022

(30) Foreign Application Priority Data

Jan. 22, 2021 (JP) .............................. JP2021-008909

(51) Int. Cl.
*F02M 33/00* (2006.01)
*F02M 37/00* (2006.01)
(Continued)

(52) U.S. Cl.
CPC .............. *F02M 33/00* (2013.01); *B01J 8/001* (2013.01); *B01J 8/02* (2013.01); *F02D 19/0671* (2013.01); *F02D 33/006* (2013.01); *F02M 27/02* (2013.01); *F02M 37/0023* (2013.01); *F02M 37/0047* (2013.01); *B01J 2208/00539* (2013.01);
(Continued)

(58) Field of Classification Search
CPC .... F02M 27/02; F02M 33/02; F02M 37/0023; F02M 37/0047; F02M 37/0064; F02D 19/0671; F02D 19/081; F02D 33/006; F02D 41/0025; B01J 8/001; B01J 8/02; B01J 2208/00539; B01J 2208/00548
See application file for complete search history.

(56) References Cited

U.S. PATENT DOCUMENTS

| 3,955,538 A * | 5/1976 | Noguchi | ................. F02B 27/04 123/3 |
| 2004/0159289 A1* | 8/2004 | Taylor, III | ............. F02M 25/12 123/3 |

(Continued)

FOREIGN PATENT DOCUMENTS

| JP | 2000274285 A | * 10/2000 | ................ F02B 1/12 |
| JP | 2001355523 A | * 12/2001 | |

(Continued)

*Primary Examiner* — John M Zaleskas
(74) *Attorney, Agent, or Firm* — Duft & Bornsen, PC

(57) ABSTRACT

Fuel reform apparatus includes: internal combustion engine including injector and configured so that compression-ignition combustion is carried out in combustion chamber; reform unit interposed in fuel supply path from fuel tank to injector and including reformer reforming fuel stored in fuel tank by oxidation reaction; ignition timing detector detecting ignition timing of fuel in combustion chamber; and controller including CPU and memory. Controller performs: determining whether fuel has been supplied into fuel tank; determining whether reforming is needed based on ignition timing when it is determined that fuel has been supplied; controlling operation of reform unit so as to reform fuel stored in fuel tank to supply to injector when it is determined that reforming is needed; and controlling operation of reform unit so as to supply fuel stored in fuel tank to injector without reforming when it is determined that reforming is not needed.

12 Claims, 11 Drawing Sheets

(51) Int. Cl.
  *F02M 27/02* (2006.01)
  *F02D 33/00* (2006.01)
  *B01J 8/00* (2006.01)
  *B01J 8/02* (2006.01)
  *F02D 19/06* (2006.01)

(52) U.S. Cl.
  CPC ............... *B01J 2208/00548* (2013.01); *F02D 2200/024* (2013.01)

(56) References Cited

U.S. PATENT DOCUMENTS

| | | | |
|---|---|---|---|
| 2004/0261763 A1* | 12/2004 | Hashimoto | F02D 19/12 123/304 |
| 2005/0045118 A1* | 3/2005 | Wakao | F02M 27/02 123/3 |
| 2006/0180099 A1* | 8/2006 | Aimoto | F02M 27/02 123/304 |
| 2007/0215098 A1* | 9/2007 | Hashimoto | F02M 1/165 123/3 |
| 2009/0229541 A1* | 9/2009 | Shimasaki | F02D 41/0025 123/304 |
| 2011/0132287 A1* | 6/2011 | Leone | F02B 43/12 123/3 |
| 2011/0209686 A1 | 9/2011 | McCann | |
| 2012/0145096 A1* | 6/2012 | Shimada | F02D 9/10 123/3 |
| 2012/0291424 A1* | 11/2012 | Inuzuka | F02D 19/0671 60/299 |
| 2016/0290289 A1* | 10/2016 | Hashimoto | C10L 1/06 |
| 2016/0333283 A1* | 11/2016 | Hashimoto | C07C 37/01 |
| 2016/0333286 A1* | 11/2016 | Kudo | B01J 19/30 |
| 2016/0333831 A1* | 11/2016 | Kudo | C10L 10/02 |
| 2018/0066599 A1* | 3/2018 | Narahara | F02D 41/3094 |

FOREIGN PATENT DOCUMENTS

| | | | | |
|---|---|---|---|---|
| JP | 2004190586 A | * | 7/2004 | |
| JP | 2005226622 A | * | 8/2005 | |
| JP | 2009138527 A | * | 6/2009 | |
| JP | 2010038012 A | * | 2/2010 | ............... F02B 1/12 |
| JP | 2011196367 A | * | 10/2011 | |

* cited by examiner

FUEL REFORM APPARATUS

CROSS-REFERENCE TO RELATED APPLICATION

This application is based upon and claims the benefit of priority from Japanese Patent Application No. 2021-008909 filed on Jan. 22, 2021, the content of which is incorporated herein by reference.

BACKGROUND OF THE INVENTION

Field of the Invention

This invention relates to a fuel reform apparatus configured to reform fuel supplied to a compression-ignition engine.

Description of the Related Art

Conventionally, an apparatus for compression igniting low octane gasoline is known (for example, see U.S. Unexamined Patent Application Publication No. 2011/209686 (US2011/209686A1)). In an apparatus described in US2011/209686A1, an injector is heated to raise the temperature of low octane gasoline to a predetermined temperature to make the ignition delay within a predetermined period of time.

Low octane gasoline is still in the stage of becoming widespread and is not yet sold in some areas. Thus, there is a risk that regular octane gasoline may be supplied as fuel. Even in such a case, it is preferable to ensure normal combustion. However, in the apparatus described in US2011/209686A1, it is difficult to appropriately cope with the case where regular octane gasoline is supplied.

SUMMARY OF THE INVENTION

An aspect of the present invention is a fuel reform apparatus, including: an internal combustion engine including an injector configured to inject fuel supplied from a fuel tank into a combustion chamber and configured so that compression-ignition combustion is carried out in the combustion chamber; a reform unit interposed in a fuel supply path from the fuel tank to the injector and including a reformer configured to reform fuel stored in the fuel tank by oxidation reaction; an ignition timing detector configured to detect an ignition timing of fuel in the combustion chamber; and a controller including a CPU and a memory connected to the CPU. The controller is configured to perform: determining whether fuel has been supplied into the fuel tank; determining whether a reforming is needed based on the ignition timing detected by the ignition timing detector when it is determined that fuel has been supplied into the fuel tank; controlling operation of the reform unit so as to reform fuel stored in the fuel tank by the reformer to supply to the injector when it is determined that the reforming is needed; and controlling operation of the reform unit so as to supply fuel stored in the fuel tank to the injector without reforming by the reformer when it is determined that the reforming is not needed.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 13. A fuel reform apparatus according to the embodiment of the present invention is applied to a compression ignition type engine mounted on a vehicle or the like, and reforms fuel supplied from a fuel tank to the engine as necessary.

The average global temperature is maintained in a warm range suitable for organisms by greenhouse gases in the atmosphere. Specifically, part of the heat radiated from the ground surface heated by sunlight to outer space is absorbed by greenhouse gases and re-radiated to the ground surface, whereby the atmosphere is maintained in a warm state. Increasing concentrations of greenhouse gases in the atmosphere cause a rise in average global temperature (global warming).

Carbon dioxide is a greenhouse gas that greatly contributes to global warming, and its concentration in the atmosphere depends on the balance between carbon fixed on or in the ground in the form of plants or fossil fuels and carbon present in the atmosphere in the form of carbon dioxide. For example, carbon dioxide in the atmosphere is absorbed through photosynthesis in the growth process of plants, causing a decrease in the concentration of carbon dioxide in the atmosphere. Carbon dioxide is also released into the atmosphere through combustion of fossil fuels, causing an increase in the concentration of carbon dioxide in the atmosphere. In order to mitigate global warming, it is necessary to reduce carbon emissions by replacing fossil fuels with renewable energy sources such as sunlight and wind power or renewable fuels derived from biomass or the like.

As such renewable fuels, low octane gasoline obtained by Fischer-Tropsch (FT) synthesis is becoming widespread. The low-octane gasoline has high ignitability and can be applied to a compression ignition type engine. However, the low octane gasoline is still in the stage of becoming widespread and is not yet sold in some areas. On the other hand, regular octane gasoline for a spark ignition type engine, which is currently in widespread use, has low ignitability. When the regular octane gasoline is applied to a compression ignition type engine as it is, it is difficult to secure its exhaust gas performance and, thus, may cause a misfire. Therefore, according to a present embodiment, a fuel reform apparatus is configured as follows so that fuel supplied from a fuel tank to an engine is reformed as necessary, and both low octane gasoline and regular octane gasoline are compression-ignited by a single engine.

Figure 1:
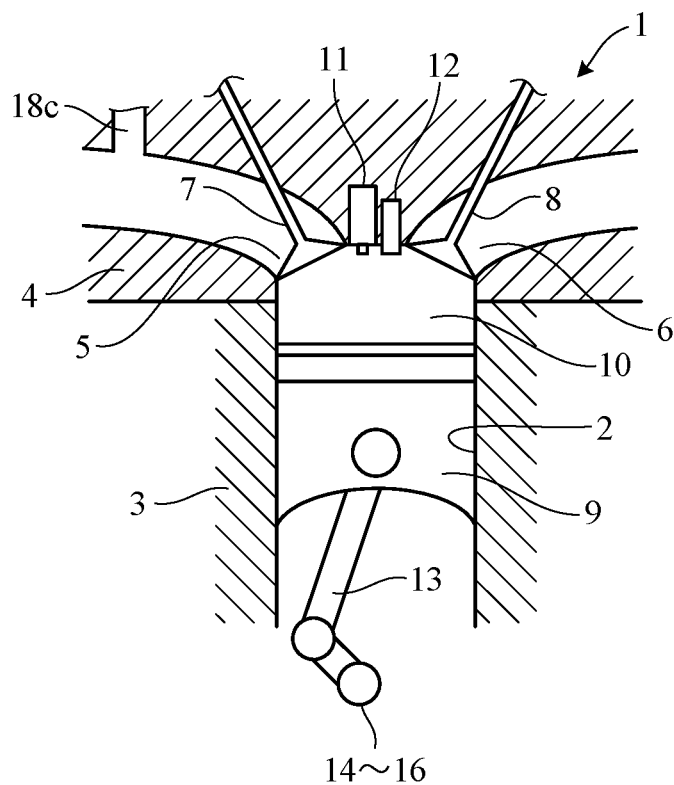
FIG. 1 is a diagram schematically illustrating an example of an internal configuration of an engine to which a fuel reform apparatus according to an embodiment of the present invention is applied.

FIG. 1 is a diagram schematically illustrating an example of an internal configuration of an engine 1 to which a fuel reform apparatus according to an embodiment of the present invention is applied. The engine 1 is a compression ignition type gasoline engine, and is mounted on a vehicle, for example.

As illustrated in FIG. 1, the engine 1 includes a cylinder block 3 in which cylinders 2 are provided, and a cylinder head 4 that covers an upper portion of the cylinder block 3. The cylinder head 4 is provided with an intake port 5 through which intake air to the engine 1 passes and an exhaust port 6 through which exhaust air from the engine 1 passes. The intake port 5 is provided with an intake valve 7 that opens and closes the intake port 5, and the exhaust port 6 is provided with an exhaust valve 8 that opens and closes the exhaust port 6. The intake valve 7 and the exhaust valve 8 open and close by being driven by an unillustrated valve mechanism.

Figure 7:
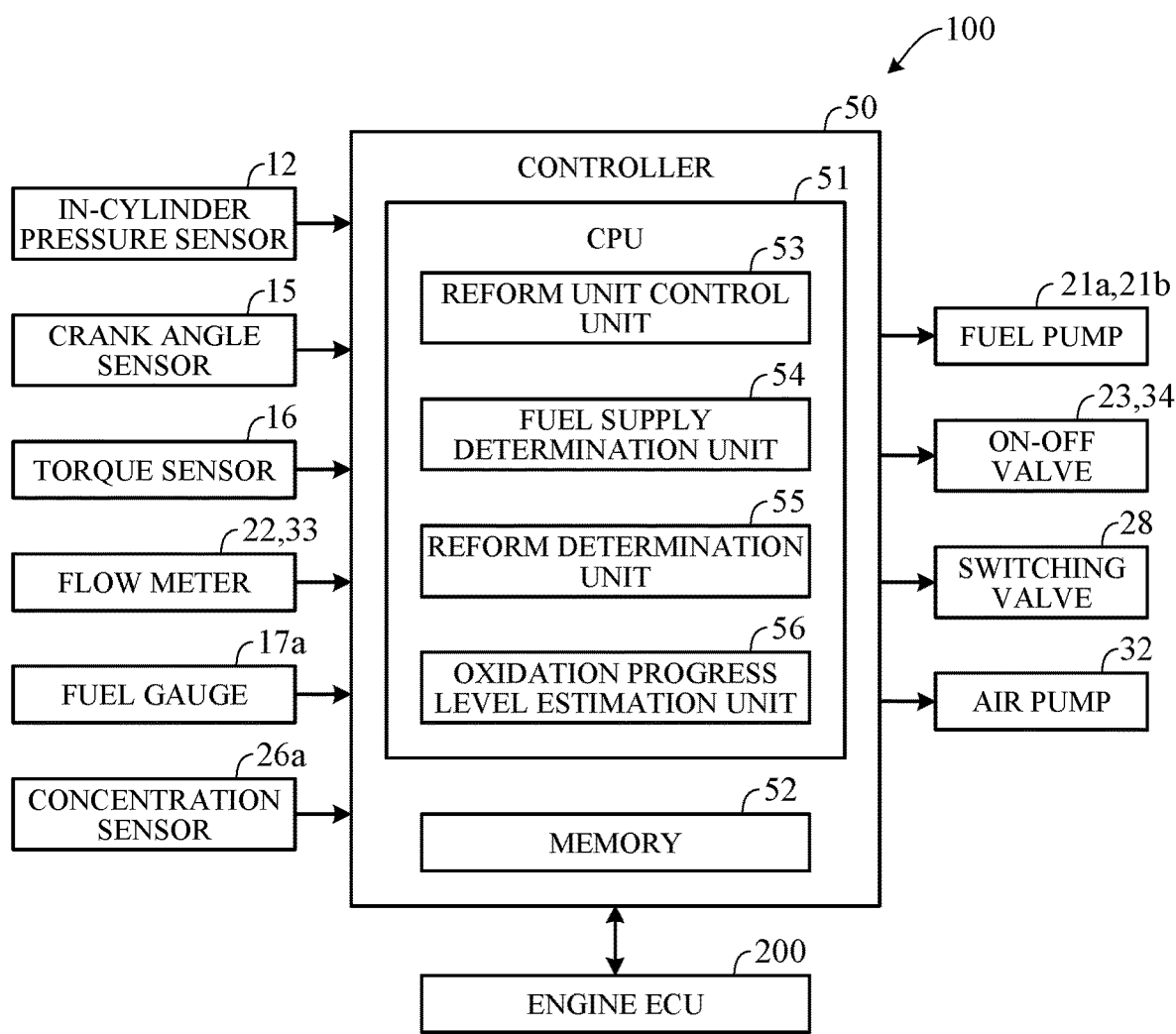
FIG. 7 is a block diagram schematically illustrating an example of configuration of main part around a controller of the fuel reform apparatus in FIG. 5.

In each cylinder 2, a piston 9 is disposed slidably within the cylinder 2, and a combustion chamber 10 is provided facing the piston 9. The engine 1 is provided with an injector 11 directed toward the combustion chamber 10, and the injector 11 injects fuel into the combustion chamber 10. The operation (fuel injection timing (valve opening timing), fuel injection amount (valve opening time)) of the injector 11 is controlled by an engine electronic control unit (ECU) 200 (FIG. 7). The engine 1 is also provided with an in-cylinder pressure sensor 12 that includes a quartz piezoelectric pressure sensor or the like and detects the pressure in the combustion chamber 10.

When the intake port 5 is opened, the exhaust port 6 is closed, and the piston 9 descends, air (fresh air) is sucked into the combustion chamber 10 from the intake port 5 (intake stroke). When the intake port 5 and the exhaust port 6 are closed and the piston 9 rises, the air in the combustion chamber 10 is compressed, and the pressure in the combustion chamber 10 gradually rises (compression stroke). When fuel is injected from the injector 11 to the combustion chamber 10 near a compression top dead center (TDC), a mixture of the fuel and air in the combustion chamber 10 is compressed, the pressure in the combustion chamber 10 gradually increases, and the fuel burns by self-ignition. When fuel self-ignition starts in the combustion chamber 10, the pressure in the combustion chamber 10 rapidly rises, and the piston 9 descends (expansion stroke). When the intake port 5 is closed, the exhaust port 6 is opened, and the piston 9 rises, air (exhaust) in the combustion chamber 10 is discharged from the exhaust port 6 (exhaust stroke).

When the piston 9 reciprocates along the inner wall of the cylinder 2, a crank shaft 14 rotates via a connecting rod 13. The crank shaft 14 of the engine 1 is also provided with a crank angle sensor 15 that detects a rotation angle (crank angle) of the crank shaft 14. In addition, for example, a magnetostrictive torque sensor 16 that detects the output torque of the engine 1 is also provided. Although not illustrated, the engine 1 is also provided with a water temperature sensor or the like that detects a temperature of cooling water (engine water temperature) of the engine 1.

Figure 2:
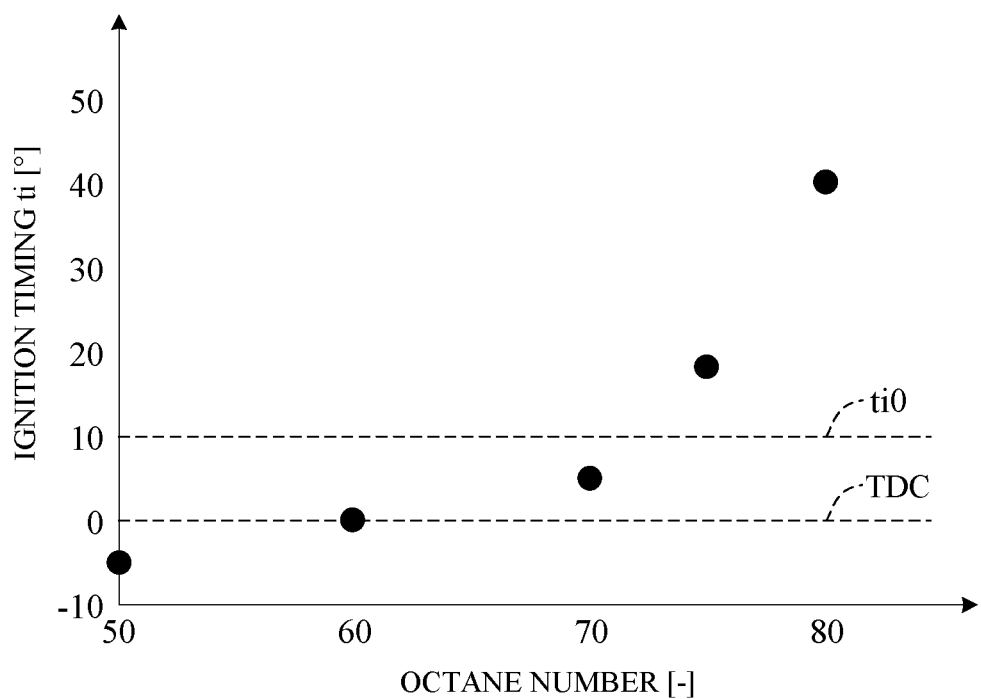
FIG. 2 is a diagram for explaining relationship between octane numbers of fuel and ignitability.

FIG. 2 is a diagram for explaining the relationship between octane numbers of fuel and ignitability, and illustrates an example of ignition timings ti of a plurality of fuels having different octane numbers as a crank angle [°] based on the compression top dead center TDC. More specifically, there will be described an example of a crank angle at which fuel self-ignition starts in the combustion chamber 10 and the pressure in the combustion chamber 10 rapidly increases. The crank angle is specified based on the pressure in the combustion chamber 10 detected by the in-cylinder pressure sensor 12 and a crank angle detected by the crank angle sensor 15.

As illustrated in FIG. 2, with the fuel having low ignitability in which the octane number exceeds 70, the ignition timing ti is significantly delayed from the compression top dead center TDC. In this case, the maximum thermal efficiency of the engine 1 is significantly reduced, and combustion becomes unstable. In order to ensure sufficient combustion performance of the engine 1, it is necessary to reform the fuel when the ignition timing ti is greater than or equal to a predetermined crank angle ti0 (for example,) 10° ).

Figure 3:
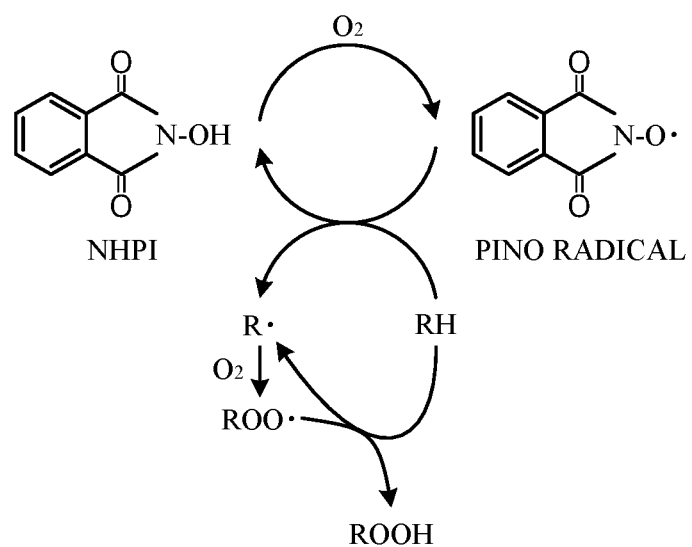
FIG. 3 is a diagram for explaining chemical reaction when fuel is reformed.

FIG. 3 is a diagram for explaining a chemical reaction when the fuel is reformed. A fuel containing a hydrocarbon as a main component is oxidatively reformed using a catalyst such as N-hydroxyphthalimide (NHPI) to produce a peroxide, so that ignitability thereof can be improved. Specifically, in NHPI, a hydrogen molecule is easily extracted using an oxygen molecule to produce a phthalimide-N-oxyl (PINO) radical. With the PINO radical, a hydrogen molecule is extracted from a hydrocarbon (RH) contained in the fuel to produce an alkyl radical (R•). The alkyl radical is bonded to an oxygen molecule to produce an alkyl peroxy radical (ROO•). With the alkyl peroxy radical, a hydrogen molecule is extracted from a hydrocarbon contained in the fuel to produce an alkyl hydroperoxide (ROOH), which are peroxides.

Figure 4:
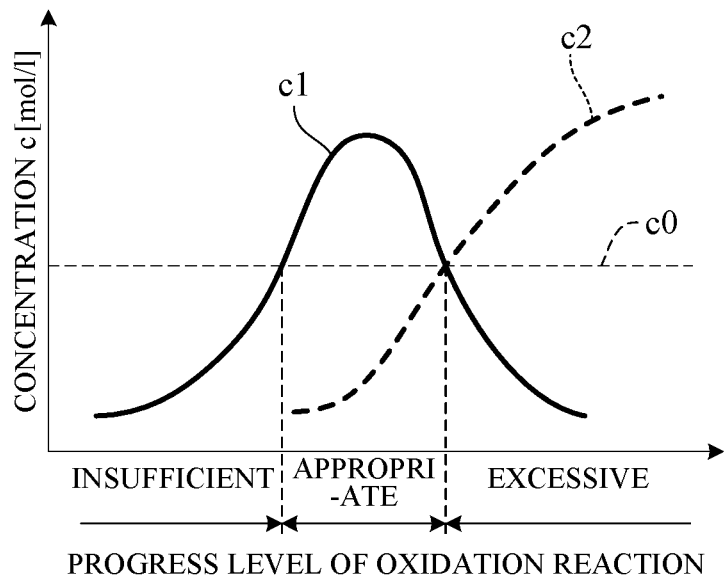
FIG. 4 is a diagram for explaining progress levels of oxidation reaction of the fuel.

FIG. 4 is a diagram for explaining progress levels of oxidation reaction of the fuel, and illustrates an example of changes in peroxide concentration c1 and oxide concentration c2 when the oxidation reaction progresses. As illustrated in FIG. 4, when the oxidation reaction proceeds, the peroxide concentration c1 increases, and when the oxidation reaction further proceeds, the peroxide is decomposed into oxides such as alcohol, aldehyde, and ketone, and the peroxide concentration c1 decreases and the oxide concentration c2 increases.

In order to increase the peroxide concentration c1 in the fuel and improve the ignitability of the fuel to a state suitable for compression ignition, it is necessary to adjust the progress level of the oxidation reaction within an appropriate range. Specifically, it is necessary to adjust the peroxide concentration c1 in the reformed fuel to a predetermined concentration c0 (for example, 0.15 [mol/l]) or more so that the octane number of the fuel (reformed fuel) after the oxidation reforming becomes 70 or less (FIG. 2). The peroxide concentration c1 in the reformed fuel can be detected by an appropriate concentration sensor.

In a case where the peroxide concentration c1 is smaller than the predetermined concentration c0, the peroxide concentration c1 is equal to or greater than the oxide concentration c2 when the progress level of the oxidation reaction is insufficient, and the peroxide concentration c1 is smaller than the oxide concentration c2 when the progress level of the oxidation reaction is excessive. When the hydrocarbon contained in the fuel is decomposed to an oxide, the calorific value of the reformed fuel decreases, and the engine output decreases. That is, the output torque of the engine 1 is proportional to the product of the calorific value of the reformed fuel and the fuel injection amount. The oxide concentration c2 can be estimated based on the fuel injection amount and the output torque of the engine 1.

Figure 5:
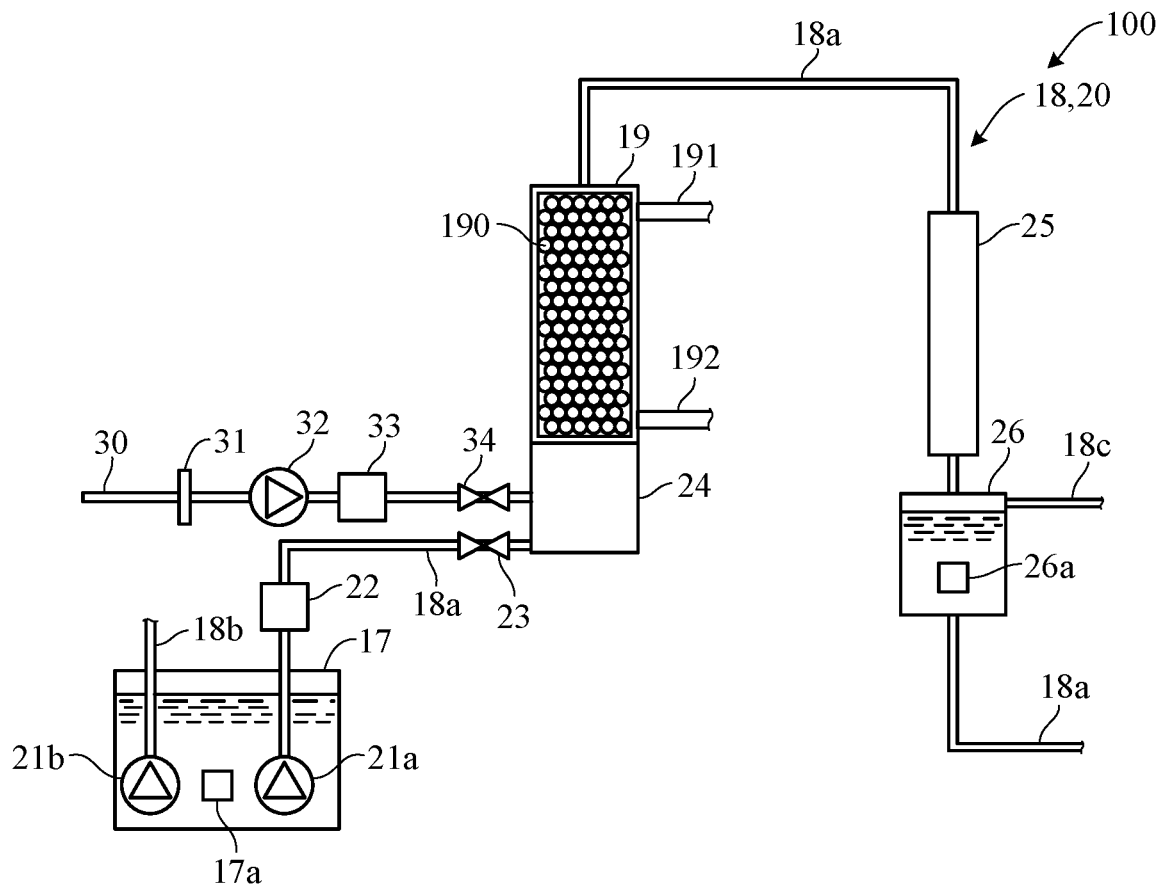
FIG. 5 is a diagram schematically illustrating an example of configuration of the fuel reform apparatus according to the embodiment of the present invention.
Figure 6:
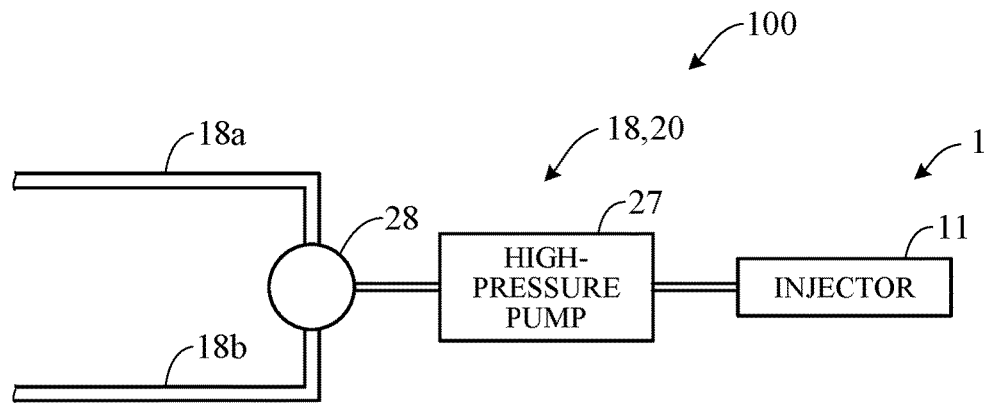
FIG. 6 is a diagram schematically illustrating an example of configuration around a switching valve of the fuel reform apparatus in FIG. 5.

FIGS. 5 to 7 are diagrams schematically illustrating an example of a configuration of a fuel reform apparatus (hereinafter, referred to as an apparatus) 100 according to the embodiment of the present invention. As illustrated in FIGS. 5 to 7, the apparatus 100 includes a reform unit 20 having a reformer 19, which is interposed in a fuel supply path 18 from a fuel tank 17 to an injector 11 of the engine 1 and oxidatively reforms the fuel, and a controller 50 that controls an operation of the reform unit 20.

The fuel tank 17 is provided with a fuel gauge 17a that detects the remaining amount of the fuel stored in the fuel tank 17. The fuel gauge 17a includes, for example, a float-type level sensor, and outputs a signal corresponding to the liquid level of the fuel in the fuel tank 17.

As illustrated in FIGS. 5 and 6, the fuel supply path 18 includes a first path 18a that runs from the fuel tank 17 to the injector 11 of the engine 1 and passes through the reformer 19, and a second path 18b that runs from the fuel tank 17 to the injector 11 of the engine 1 and bypasses the reformer 19.

The reform unit 20 includes, on the first path 18a from fuel tank 17 to reformer 19, a fuel pump 21a that pumps up fuel stored in fuel tank 17, a flow meter 22 that detects a flow rate of the fuel, an on-off valve 23 that opens and closes the first path 18a, and a mixer 24. In addition, on the first path 18a from the reformer 19 to the injector 11 of the engine 1, there are provided a flocculator 25 that cools the reformed fuel by the traveling wind of the vehicle or the like, a gas-liquid separator 26 that performs the gas-liquid separation of the reformed fuel, and a high-pressure pump 27 that pumps the fuel. As illustrated in FIGS. 5 and 1, the gas phase of the reformed fuel is supplied to the intake port 5 of the engine 1 via a third path 18c, and is sucked into the combustion chamber 10 together with fresh air.

The gas-liquid separator 26 is provided with a concentration sensor 26a that detects the peroxide concentration c1 in the reformed fuel (liquid phase). The concentration sensor 26a is constituted by, for example, a capacitance type concentration sensor that is provided at the bottom of the gas-liquid separator 26 and measures the dielectric constant of the reformed fuel in the gas-liquid separator 26, and outputs a signal corresponding to the peroxide concentration c1 in the reformed fuel.

As illustrated in FIGS. 5 and 6, the reform unit 20 includes a fuel pump 21b that pumps up the fuel stored in the fuel tank 17 also on the second path 18b, and the fuel pumped up by the fuel pump 21b is supplied to the high-pressure pump 27 via the second path 18b. The operation (fuel pressure) of the high-pressure pump 27 is controlled by the engine ECU 200 (FIG. 7).

As illustrated in FIG. 6, the reform unit 20 includes a switching valve 28 that switches the fuel supply path 18 to either the first path 18a or the second path 18b. When the fuel supply path 18 is switched to the first path 18a, the fuel stored in the fuel tank 17 is supplied to the reformer 19 and reformed according to the operation of the high-pressure pump 27, and the reformed fuel is supplied to the injector 11 via the high-pressure pump 27 and injected into the combustion chamber 10 (FIG. 1). When the fuel supply path 18 is switched to the second path 18b, the fuel stored in the fuel tank 17 is supplied to the injector 11 through the high-pressure pump 27 without being reformed by the reformer 19 according to the operation of the high-pressure pump 27, and is injected into the combustion chamber 10 (FIG. 1).

As illustrated in FIG. 5, the reform unit 20 includes, on an air supply path 30 for supplying air to the mixer 24, an air filter 31, an air pump 32 for pumping air, a flow meter 33 for detecting a flow rate of air, and an on-off valve 34 for opening and closing the air supply path 30. The fuel supplied to the mixer 24 via the fuel supply path 18 (first path 18a) according to the operation of the high-pressure pump 27 and the air supplied to the mixer 24 via the air supply path 30 according to the operation of the air pump 32 are mixed in the mixer 24 and supplied to the reformer 19.

The reformer 19 includes, for example, a double tube having an outer tube and an inner tube, and is configured as a reactor (fixed bed reactor) in which a solid catalyst 190 such as an NHPI catalyst is filled in one of a cylindrical space between the outer tube and the inner tube and a space in the inner tube, and fuel undergoes an oxidation reaction in the presence of the catalyst. The solid catalyst 190 is configured as, for example, a silica tablet having a diameter of 1 mm and a height of 1 mm on which an NHPI catalyst is supported. Silica alumina, zeolite, or the like may be used as a carrier of the solid catalyst 190, and the solid catalyst 190 may be provided in shape of beads or powder.

The reformer 19 is configured as a reflux tube in which cooling water is supplied from the warmed engine 1 to the other of the cylindrical space and the space in the inner pipe via a path 191 to raise the temperature of the reactor. Since the engine water temperature after the warm-up is maintained in the temperature range from 70 to 110° C., the oxidation reaction of the fuel is suitably promoted. The cooling water after raising the temperature of the reformer 19 (reactor) is returned to the engine 1 via the path 192.

FIG. 7 is a block diagram schematically illustrating an example of a configuration of a main part around the controller 50. As illustrated in FIG. 7, the controller 50 includes an electronic control unit (ECU) including a computer having a CPU 51, a memory 52 such as a ROM and a RAM, and other peripheral circuits (not illustrated) such as an I/O interface.

To the controller 50, sensors such as the in-cylinder pressure sensor 12, the crank angle sensor 15, the torque sensor 16, the flow meters 22 and 33, the fuel gauge 17a, and the concentration sensor 26a are electrically connected, and signals from the respective sensors are input thereto. In addition, to the controller 50, the actuators such as the fuel pumps 21a and 21b, on-off valves 23 and 34, switching valve 28, and air pump 32 are electrically connected, and a control signal is transmitted from the controller 50 to each actuator. Furthermore, the controller 50 is configured to be able to communicate with other in-vehicle ECUs such as the engine ECU 200 via a communication network such as a controller area network (CAN) mounted on the vehicle.

The memory 52 stores various control programs and information such as a threshold used in the programs. The CPU 51 includes, as functional configurations, a reform unit control unit 53 that controls the operation of the reform unit 20, a fuel supply determination unit 54, a reform determination unit 55, and an oxidation progress level estimation unit 56. That is, the CPU 51 functions as the reform unit control unit 53, fuel supply determination unit 54, reform determination unit 55, and oxidation progress level estimation unit 56.

The fuel supply determination unit 54 determines whether fuel has been supplied to the fuel tank 17 based on a change in the remaining amount of the fuel stored in the fuel tank 17 detected by the fuel gauge 17a. For example, whether fuel has been supplied to the fuel tank 17 is determined by comparing the previous remaining amount of fuel with the current remaining amount of fuel each time the vehicle and the controller 50 are started. It may be determined whether fuel has been supplied by detecting opening and closing of the fuel lid.

When the fuel supply determination unit 54 determines that fuel has been supplied, the reform determination unit 55 determines whether the reforming is needed based on the ignition timing ti of the fuel. Specifically, the fuel ignition timing ti is calculated based on the pressure in the combustion chamber 10 detected by the in-cylinder pressure sensor 12 and the crank angle detected by the crank angle sensor 15. When the ignition timing ti is equal to or greater than the predetermined crank angle ti0 (FIG. 2), it is determined that the reforming is needed. When the ignition timing ti is smaller than the predetermined crank angle ti0, it is determined that the reforming is not needed.

The reform determination unit 55 may determine whether the reforming is needed based on the peroxide concentration c1 in the reformed fuel. Specifically, when the peroxide concentration c1 in the reformed fuel detected by the concentration sensor 26a is smaller than the predetermined concentration c0 (FIG. 4), it is determined that the reforming is needed, and when the peroxide concentration c1 is equal to or greater than the predetermined concentration c0, it is determined that the reforming is not needed.

When the reform determination unit 55 determines that reforming is needed, the reform unit control unit 53 switches the fuel supply path 18 to the first path 18a by the switching valve 28 so that the fuel stored in the fuel tank 17 is reformed by the reformer 19 and supplied to the injector 11 (reforming on).x On the other hand, when the reform determination unit 55 determines that the reforming is not needed, the switching valve 28 switches the fuel supply path 18 to the second path 18b so that the fuel stored in the fuel tank 17 is supplied to the injector 11 without being reformed by the reformer 19 (reforming off).

The oxidation progress level estimation unit 56 determines whether the progress level of the oxidation reaction (oxidation progress level) in the reformer 19 is within an appropriate range based on the ignition timing ti of the fuel when the reforming is on. Specifically, the ignition timing ti of the reformed fuel is calculated based on the pressure in the combustion chamber 10 detected by the in-cylinder pressure sensor 12 and the crank angle detected by the crank angle sensor 15, and when the ignition timing ti is smaller than the predetermined crank angle ti0 (FIG. 2), it is determined that the oxidation progress level is within an appropriate range. When the ignition timing ti is equal to or greater than the predetermined crank angle ti0, it is determined that the oxidation progress level is out of the appropriate range.

The oxidation progress level estimation unit 56 may determine whether the oxidation progress level is within the appropriate range based on the peroxide concentration c1 in the reformed fuel. Specifically, when the peroxide concentration c1 in the reformed fuel detected by the concentration sensor 26a is equal to or greater than the predetermined concentration c0 (FIG. 4), it is determined that the oxidation progress level is within the appropriate range, and when the peroxide concentration c1 is smaller than the predetermined concentration c0, it is determined that the oxidation progress level is out of the appropriate range.

Further, when determining that the oxidation progress level is out of the appropriate range, the oxidation progress level estimation unit 56 determines whether the oxidation progress level is excessive or insufficient based on the oxide concentration c2 in the reformed fuel. The oxide concentration c2 in the reformed fuel can be estimated based on the fuel injection amount by the injector 11 and the output torque of the engine 1 detected by the torque sensor 16. The fuel injection amount may be calculated based on the fuel flow rate detected by the flow meter 22, or may be calculated based on the fuel pressure (a command value to the high-pressure pump 27) and the fuel injection amount (a command value to the injector 11) acquired by communication with the engine ECU 200.

The oxidation progress level estimation unit 56 determines that the oxidation progress level is excessive when the oxide concentration c2 is equal to or greater than the peroxide concentration c1 detected by the concentration sensor 26a, and determines that the oxidation progress level is insufficient when the oxide concentration c2 is smaller than the peroxide concentration c1 (FIG. 4). The oxidation progress level may be determined to be excessive when the oxide concentration c2 is equal to or greater than the predetermined concentration c0, and the oxidation progress level may be determined to be insufficient when the oxide concentration c2 is smaller than the predetermined value.

The reform unit control unit 53 controls the operation of the reform unit 20 according to the progress level of the oxidation reaction estimated by the oxidation progress level estimation unit 56, and adjusts a reforming rate of the reformer 19. Specifically, when it is determined that the oxidation progress level is excessive, the operation of the air pump 32 is controlled to reduce the amount of air supplied to the reformer 19, thereby decreasing the reforming rate of the reformer 19. On the other hand, when it is determined that the oxidation progress level is insufficient, the operation of the air pump 32 is controlled to increase the amount of air supplied to the reformer 19, and the reforming rate of the reformer 19 is increased. The reforming rate by reformer 19 may be adjusted by adjusting the flow rate of the cooling water refluxed between engine 1 and reformer 19.

Figure 8A:
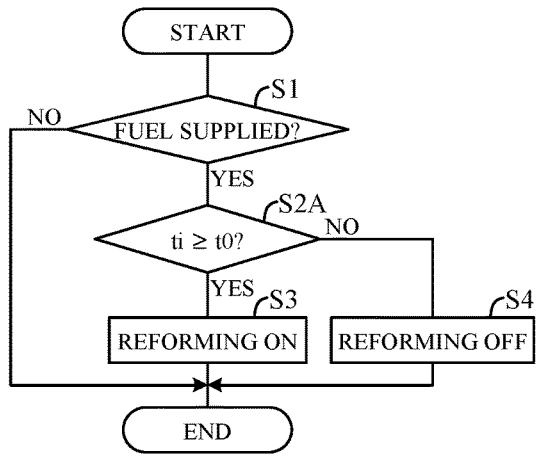
FIG. 8A is a flowchart illustrating an example of a reform switching process executed by the fuel reform apparatus according to the embodiment of the present invention.
Figure 8B:
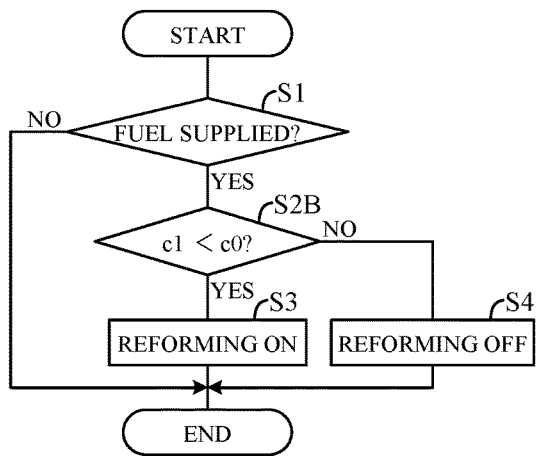
FIG. 8B is a diagram illustrating a modification of the FIG. 8A.

FIGS. 8A and 8B are flowcharts illustrating an example of a reform switching process executed by the CPU 51 of the controller 50. The processing in FIGS. 8A and 8B is started, for example, when the vehicle and the controller 50 are activated.

In the process of FIG. 8A, first, in S1 (S: process step), it is determined by the process of the fuel supply determination unit 54 whether fuel has been supplied to the fuel tank 17 while the vehicle and the controller 50 are stopped. If the result is YES in S1, the process proceeds to S2A, and if the result is NO, the process ends. In S2A, the ignition timing ti is calculated by the process in the reform determination unit 55, and it is determined whether or not the ignition timing ti is equal to or greater than the predetermined crank angle ti0.

If the result is YES in S2A, it is assumed that the ignitability of the fuel is insufficient, and the process proceeds to S3. The operation of the switching valve 28 is controlled by the process in the reform unit control unit 53 to switch the fuel supply path 18 to the first path 18a, the reforming in the reformer 19 is turned on, and the process is ended. On the other hand, if the result is NO in S2A, it is assumed that the ignitability of the fuel is sufficient, and the process proceeds to S4. The operation of the switching valve 28 is controlled by the process in the reform unit control unit 53 to switch the fuel supply path 18 to the second path 18b, the reforming in the reformer 19 is turned off, and the process is ended.

In the process of FIG. 8B, instead of S2A of FIG. 8A, the reform determination unit 55 determines, in S2B, whether or not the peroxide concentration $c_1$ is smaller than the predetermined concentration $c_0$, and determines whether or not the ignitability of the fuel is insufficient and the reforming is needed.

As described above, the ignitability of the fuel in the fuel tank 17 after fuel supply is evaluated based on the ignition timing ti and the peroxide concentration $c_1$ (S1, S2A, S2B), and when the ignitability is not suitable for compression ignition, the fuel is reformed by the reformer 19 and then supplied to the engine 1 (S3). Therefore, it is possible to ensure sufficient combustion performance of the compression ignition type engine mounted on a flexible fuel vehicle (FFV) to which low octane gasoline or regular octane gasoline can be supplied.

Figure 9A:
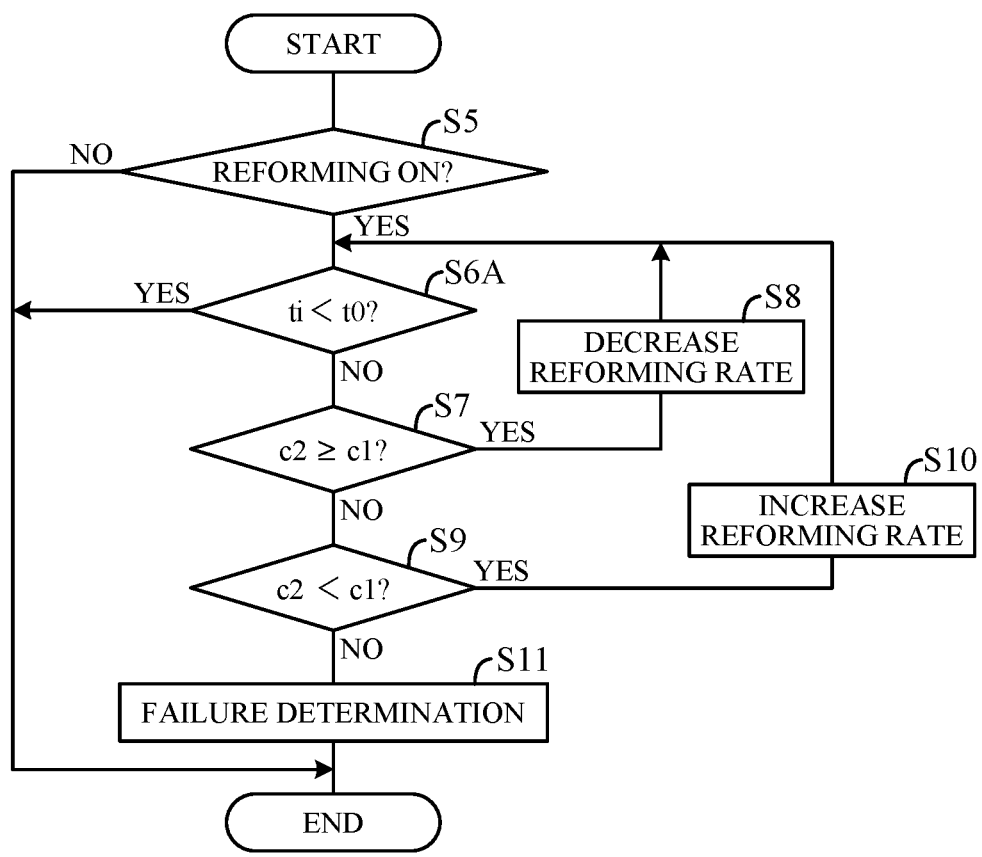
FIG. 9A is a flowchart illustrating an example of a reforming rate adjustment process executed by the fuel reform apparatus according to the embodiment of the present invention.
Figure 9B:
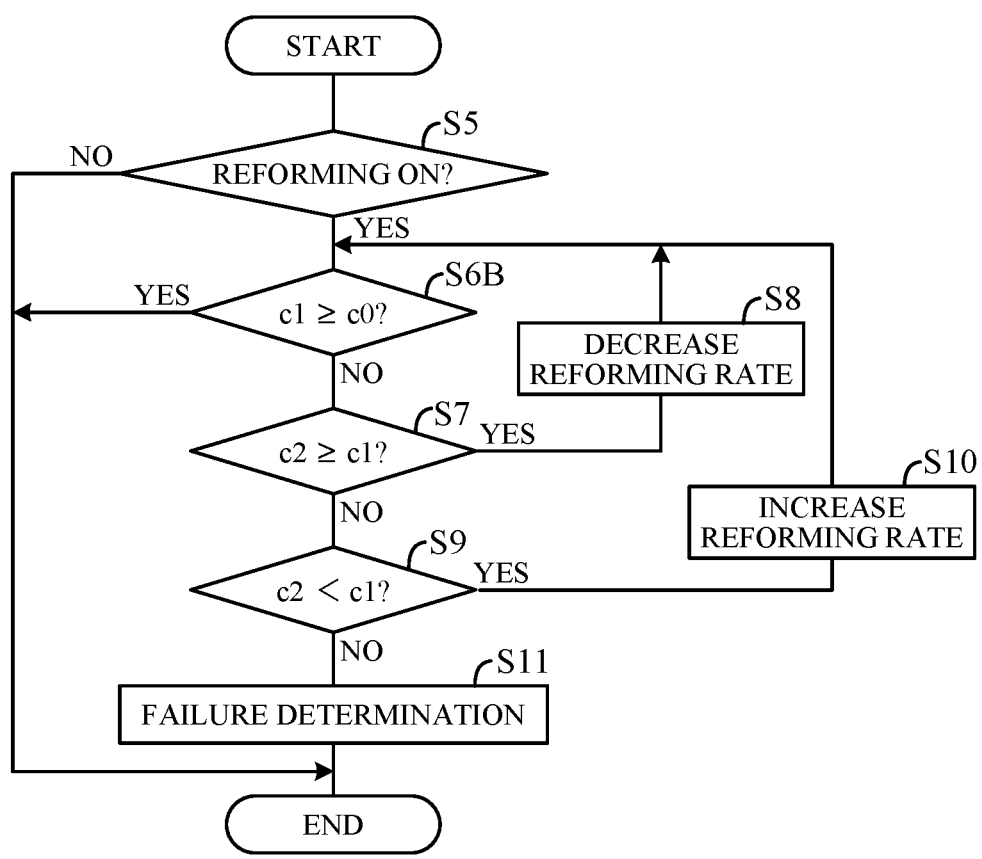
FIG. 9B is a diagram illustrating a modification of the FIG. 9A.

FIGS. 9A and 9B are flowcharts illustrating an example of a reforming rate adjustment process executed by the CPU 51 of the controller 50. The processing in FIGS. 9A and 9B is started, for example, when the reforming by reformer 19 is turned on.

In the process of FIG. 9A, first, in S5, it is determined whether or not the reforming by reformer 19 is on. When the result is YES in S5, the process proceeds to S6A, and when the result is NO, the process ends. In S6A, the oxidation progress level estimation unit 56 calculates the ignition timing ti of the reformed fuel, and determines whether or not the ignition timing ti is smaller than the predetermined crank angle $ti_0$. If the result is YES in S6A, it is determined that the oxidation progress level in the reformer 19 is within the appropriate range, and the process is ended.

On the other hand, if the result is NO in S6A, it is determined that the oxidation progress level in reformer 19 is out of the appropriate range, and the process proceeds to S7 to calculate the oxide concentration $c_2$ in the reformed fuel, and it is determined whether the oxide concentration $c_2$ is equal to or greater than peroxide concentration $c_1$. If the result is YES in S7, the process proceeds to S8 and, if the result is NO, the process proceeds to S9. In S8, based on an assumption that the oxidation progress level is excessive, the operation of the air pump 32 is controlled by the processing in the reform unit control unit 53 to reduce the amount of air supplied to the reformer 19, the reforming rate of the reformer 19 is decreased, and the process returns to S6A.

In S9, it is determined whether or not the oxide concentration $c_2$ is smaller than the peroxide concentration $c_1$ by the processing in the oxidation progress level estimation unit 56. If the result is YES in S9, the process proceeds to S10 and, if the result is NO, the process proceeds to S11. In S10, based on an assumption that the oxidation progress level is insufficient, the process in the reform unit control unit 53 controls the operation of the air pump 32 to increase the amount of air supplied to the reformer 19, the reforming rate of the reformer 19 is increased, and the process returns to S6A. In S11, it is determined that the apparatus 100 has failed and, for example, a failure code is transmitted to the engine ECU 200, and the process ends.

In the process of FIG. 9B, instead of S6A of FIG. 9A, it is determined, in S6B, whether or not the peroxide concentration $c_1$ in the reformed fuel is equal to or greater than the predetermined concentration $c_0$ by the process in the oxidation progress level estimation unit 56.

As described above, by estimating the oxidation progress level in reformer 19 (S6A, S6B, S7, S9) and adjusting the reforming rate by reformer 19 according to the oxidation progress level (S8, S10), the fuel can be reformed to a state suitable for compression ignition. In addition, even when gasoline of various octane numbers is supplied, or even when a plurality of gasoline having different octane numbers is mixed in the fuel tank 17, sufficient combustion performance of the compression ignition type engine mounted on the FFV can be secured.

Figure 10:
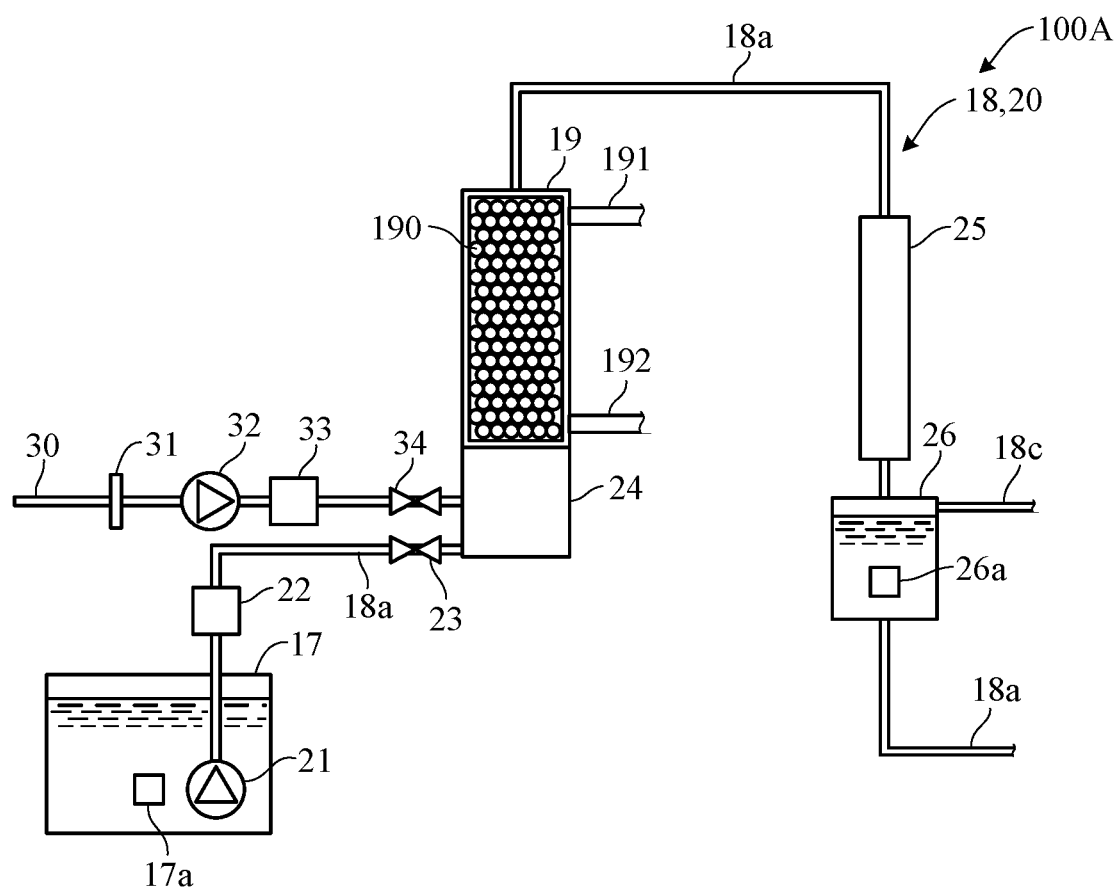
FIG. 10 is a diagram illustrating a modification of the FIG. 5.

FIG. 10 is a diagram schematically illustrating an example of a configuration of an apparatus 100A that is a modification of the apparatus 100. Unlike the apparatus 100, the apparatus 100A includes neither the second path 18b that runs from the fuel tank 17 to the injector 11 of the engine 1 and bypasses the reformer 19 nor the fuel pump 21b (FIG. 5), and does not include the switching valve 28 (FIG. 6) that switches between the first path 18a and the second path 18b.

The reform unit control unit 53 of the apparatus 100A controls the operations of the on-off valve 34 and the air pump 32 to switch between supply and shut-off of the air supplied to the reformer 19, and switches between on and off of the reforming by the reformer 19. In other words, when the reforming is needed, the on-off valve 34 is opened, and air is supplied to the reformer 19 by the air pump 32 to advance the oxidation reaction in the reformer 19. On the other hand, when the reform is not needed, the on-off valve 34 is closed to cut off the supply of air to the reformer 19, and the oxidation reaction in the reformer 19 is stopped. Whether to supply or cut off the cooling water to be refluxed between the engine 1 and the reformer 19 may be switched, and on and off of the reforming by the reformer 19 may be switched. In this case, since the fuel supply path 18 is fixed to the first path 18a, the entire apparatus can be downsized.

Figure 11:
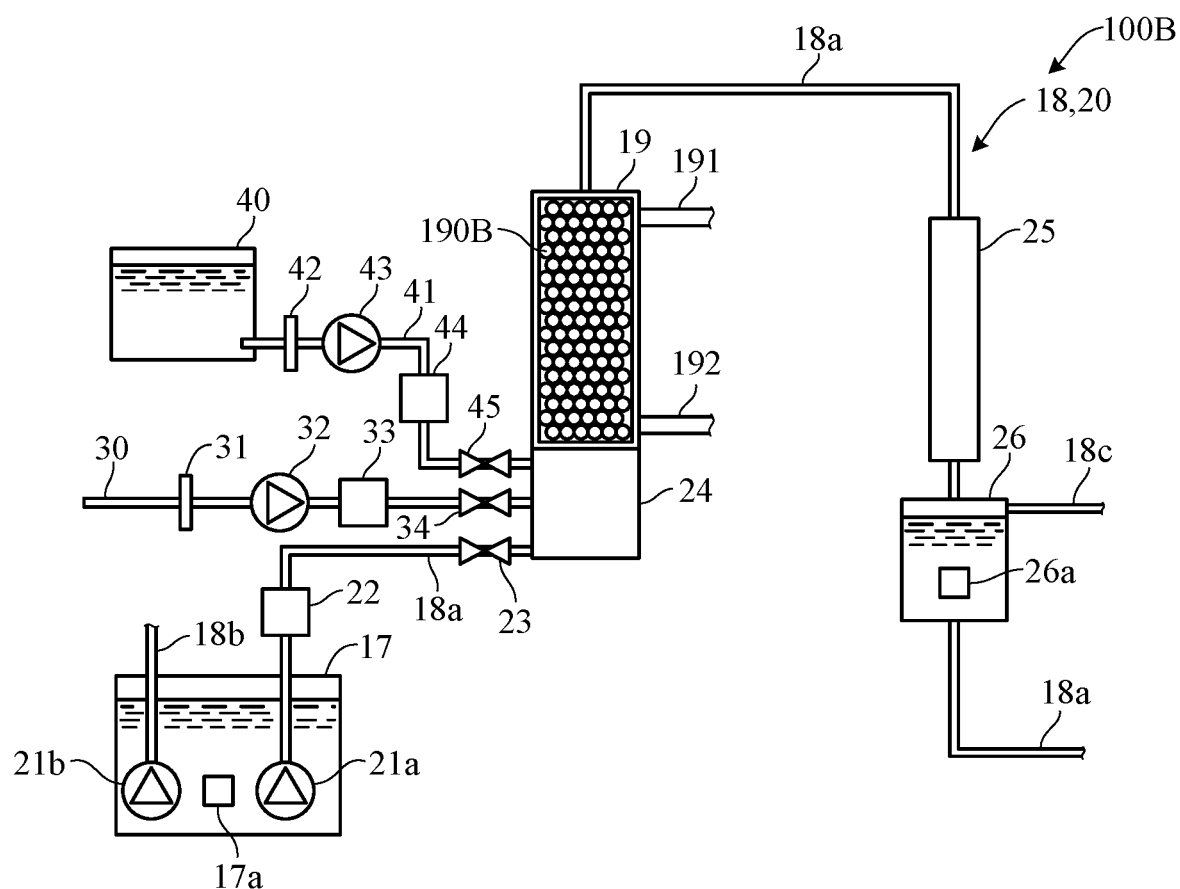
FIG. 11 is a diagram illustrating another modification of the FIG. 5.
Figure 12:
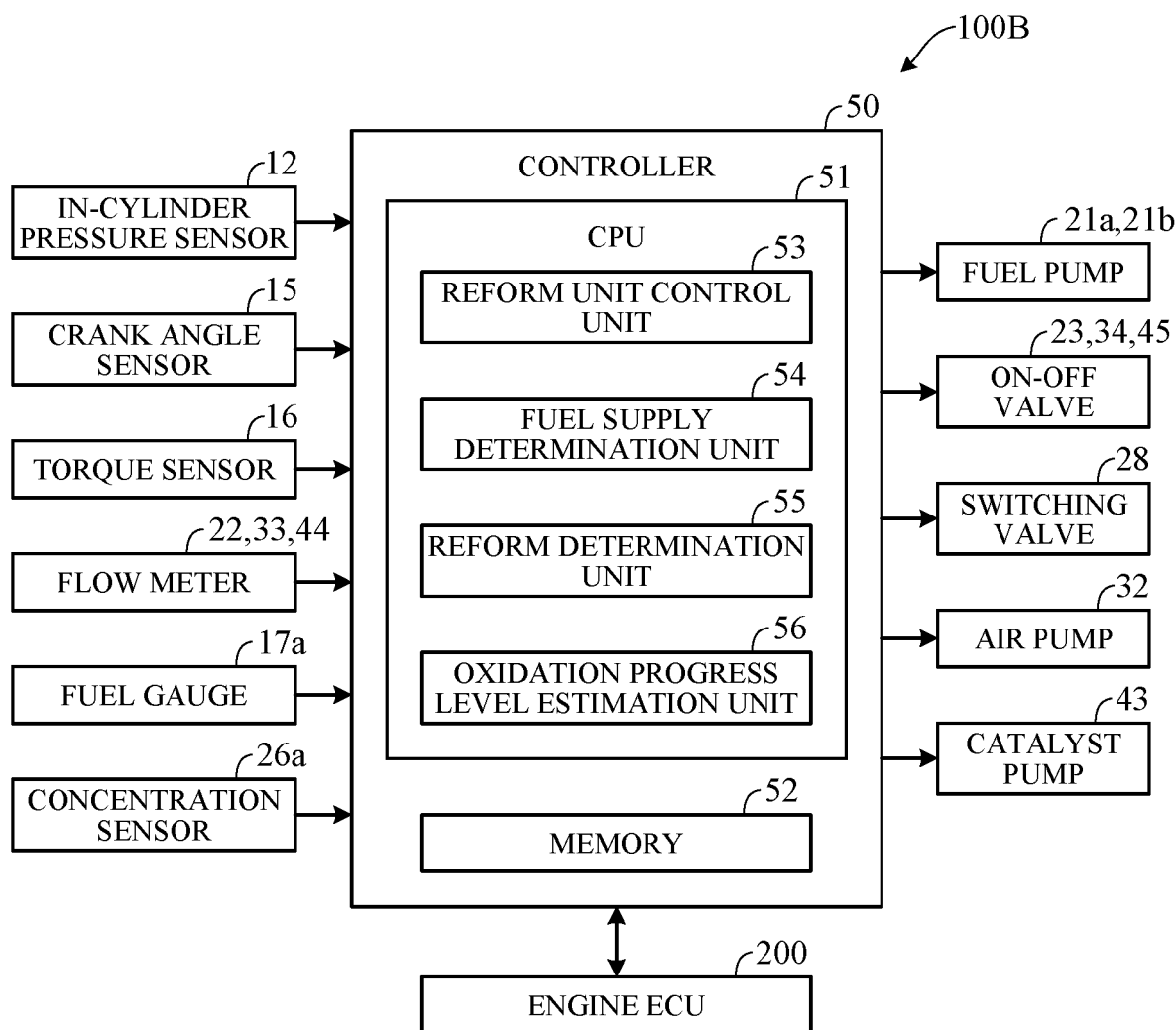
FIG. 12 is a block diagram schematically illustrating an example of configuration of main part around the controller of the fuel reform apparatus in FIG. 11.

FIGS. 11 and 12 are diagrams schematically illustrating an example of a configuration of an apparatus 100B that is a modification of the apparatus 100. In addition to the configuration of the apparatus 100, the apparatus 100B includes a catalyst tank 40 in which a catalyst solution obtained by mixing a catalyst (powder) such as an NHPI catalyst with an appropriate solvent is stored. Further, the apparatus 100B includes a filter 42, a catalyst pump 43 for pumping the catalyst solution, a flow meter 44 for detecting a flow rate of the catalyst solution, and an on-off valve 45 for opening and closing a catalyst supply path 41 on the catalyst supply path 41 for supplying the catalyst to the reformer 19.

The reformer 19 of the apparatus 100B is filled with an appropriate filler 190B such as tablets, beads, or powder, and a gap of the filler 190B serving as a reaction field of the oxidation reaction is configured to be 2 mm or smaller corresponding to the extinction distance. The gap of the filler 190B may be configured to be equal to or smaller than the maximum safety gap, for example, the maximum safety gap. The reformer 19 (reactor portion) may be made of a porous material, or may be configured such that the distance between the outer tube wall and the inner tube outer wall of the double-tube reactor is 2 mm or smaller. With this configuration, safety of the reformer 19 can be enhanced.

The reformer 19 of the apparatus 100B functions as a fluidized bed reactor in which the catalyst solution flows together with the reactants in the reactor. In this case, the particle size of the catalyst (powder) can be reduced, and the reaction efficiency can be improved. In addition, since the NHPI catalyst does not need to be separated from the reformed fuel and can be supplied to the injector 11 as it is, the entire apparatus can have a simple configuration.

The reform unit control unit 53 of the apparatus 100B adjusts the reforming rate of the reformer 19 by controlling the operation of the catalyst pump 43 in addition to the air pump 32. Specifically, the operation of the catalyst pump 43 is controlled to reduce the amount of catalyst supplied to the reformer 19, thereby decreasing the reforming rate of the reformer 19, and the amount of catalyst supplied to the reformer 19 is increased, thereby increasing the reforming rate of the reformer 19.

Figure 13:
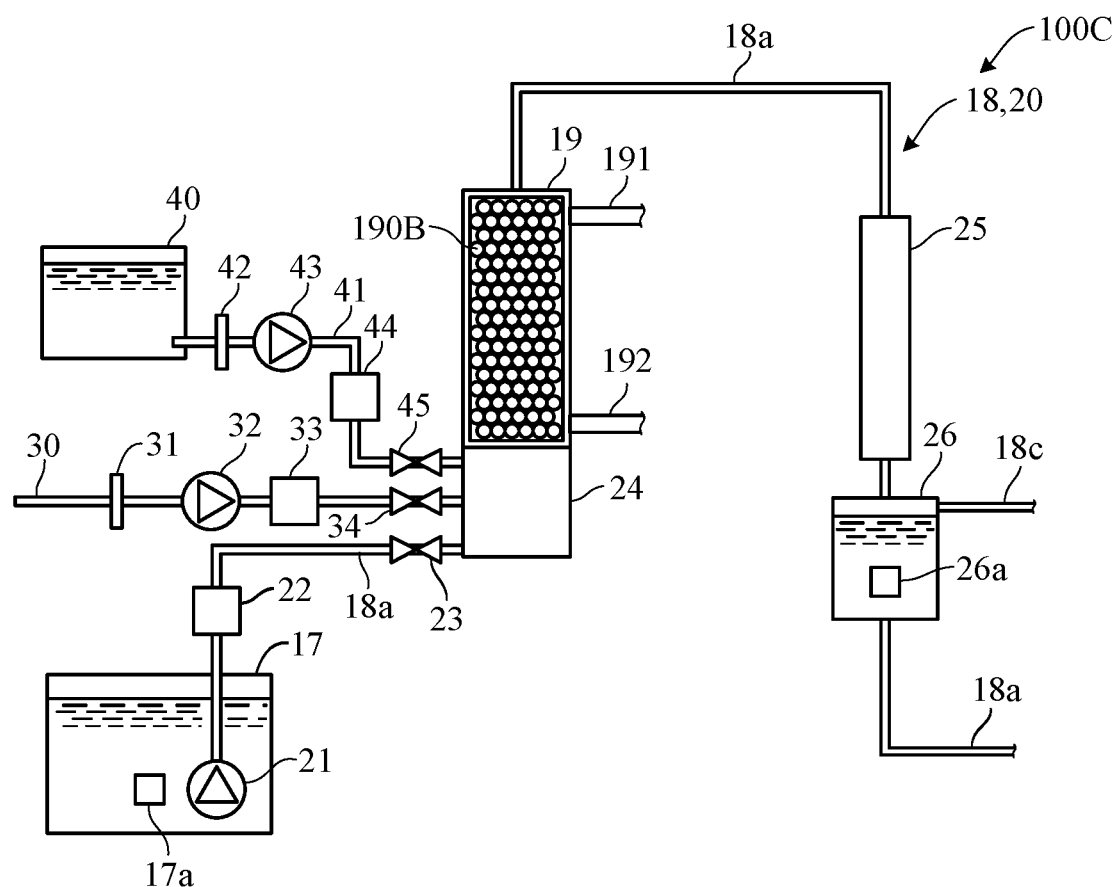
FIG. 13 is a diagram illustrating a modification of the FIG. 11.

FIG. 13 is a diagram schematically illustrating an example of a configuration of an apparatus 100C which is a modification of the apparatus 100B. Unlike the apparatus 100B, the apparatus 100C includes neither the second path 18b that runs from the fuel tank 17 to the injector 11 of the engine 1 and bypasses the reformer 19 nor the fuel pump 21b (FIG. 11), and does not include the switching valve 28 (FIG. 6) that switches between the first path 18a and the second path 18b.

The reform unit control unit 53 of the apparatus 100C controls the operations of the on-off valves 34 and 45, the air pump 32, and the catalyst pump 43 to switch the supply and shut-off of the air and the catalyst supplied to the reformer 19, and switches between on and off of the reforming by the reformer 19. In other words, when the reforming is needed, the on-off valves 34 and 45 are opened to supply air and the catalyst to the reformer 19 by the air pump 32 and the catalyst pump 43, and an oxidation reaction in the reformer 19 is advanced. On the other hand, when the reforming is not needed, the on-off valves 34 and 45 are closed to cut off the supply of air and the catalyst to the reformer 19, and the oxidation reaction in the reformer 19 is stopped. Whether to supply or cut off the cooling water to be refluxed between the engine 1 and the reformer 19 may be switched, and on and off of the reforming by the reformer 19 may be switched. In this case, since the fuel supply path 18 is fixed to the first path 18a, the entire apparatus can be downsized.

The present embodiment can achieve advantages and effects such as the following:

(1) The fuel reform apparatus 100 includes: the engine 1 including the injector 11 configured to inject fuel supplied from the fuel tank 17 into the combustion chamber 10 and configured so that compression-ignition combustion is carried out in the combustion chamber 10; the reform unit 20 interposed in the fuel supply path 18 from the fuel tank 17 to the injector 11 and including the reformer 19 configured to reform fuel stored in the fuel tank 17 by oxidation reaction; the cylinder pressure sensor 12 configured to detect the ignition timing ti of fuel in the combustion chamber 10; and the controller 50 including the CPU 51 and the memory 52 connected to the CPU 51 (FIG. 5 to FIG. 7, and FIG. 10 to FIG. 13). The controller 50 is configured to function as: the fuel supply determination unit 54 configured to determine whether fuel has been supplied into the fuel tank 17; the reform determination unit 55 configured to determine whether the reforming is needed based on the ignition timing ti detected by the cylinder pressure sensor 12 when it is determined by the fuel supply determination unit 54 that fuel has been supplied into the fuel tank 17; and the reform unit control unit 53 configured to control operation of the reform unit 20 (FIG. 7 and FIG. 12).

The reform unit control unit 53 controls operation of the reform unit 20 so as to reform fuel stored in the fuel tank 17 by the reformer 19 to supply to the injector 11 when it is determined by the reform determination unit 55 that the reforming is needed. While the reform unit control unit 53 controls operation of the reform unit 20 so as to supply fuel stored in the fuel tank 17 to the injector 11 without reforming by the reformer 19 when it is determined by the reform determination unit 55 that the reforming is not needed. As described above, since the ignitable fuel that is not suitable for compression ignition is reformed and then supplied to the engine 1, compression ignition can be performed with either low octane gasoline or regular octane gasoline. As a result, an FFV applicable to both low octane gasoline and regular octane gasoline can be realized.

(2) The fuel supply path 18 includes: the first path 18a passing through the reformer 19; and the second path 18b bypassing the reformer 19 (FIG. 5, FIG. 6, and FIG. 11). The reform unit 20 further includes: the switching valve 28 configured to switch the fuel supply path 18 between the first path 18a and the second path 18b (FIG. 6). The reform unit control unit 53 controls operation of the reform unit 20 so as to switch the fuel supply path 18 to the first path 18a when it is determined by the reform determination unit 55 that the reforming is needed. While the reform unit control unit 53 controls operation of the reform unit 20 so as to switch the fuel supply path 18 to the second path 18b when it is determined by the reform determination unit 55 that the reforming is not needed. This makes it possible to switch on and off the reforming, with a simple configuration for switching the fuel supply paths 18.

(3) The reform unit 20 includes: the reform switching unit configured to activate and inactivate the reforming by the reformer 19 (FIG. 10, FIG. 13). The reform unit control unit 53 controls operation of the reform unit 20 so as to activate the reforming by the reformer 19 when it is determined by the reform determination unit 55 that the reforming is needed. While the reform unit control unit 53 controls operation of the reform unit 20 so as to inactivate the reforming by the reformer 19 when it is determined by the reform determination unit 55 that the reforming is not needed. The entire apparatus can be downsized by unifying the fuel supply paths 18.

(4) The reform unit 20 includes the on-off valve 34 configured to open and close the air supply path 30 supplying air to the reformer 19, as the reform switching unit (FIG. 10, FIG. 13). The reform unit control unit 53 controls operation of the reform unit 20 so as to open the air supply path 30 when it is determined by the reform determination unit 55 that the reforming is needed. While the reform unit control unit 53 controls operation of the reform unit 20 so as to close the air supply path 30 when it is determined by the reform determination unit 55 that the reforming is not needed. This makes it possible to switch on and off the reforming, with a simple configuration for switching the opening and closing of the air supply path 30.

(5) The oxidation reaction of fuel in the reformer 19 is the catalytic reaction proceeding in presence of the catalyst. The reform unit 20 further includes: the catalyst tank 40 configured to store the catalyst; and the on-off valve 45 configured to open and close the catalyst supply path 41 from the catalyst tank 40 to the reformer 19, as the reform switching unit (FIG. 13). The reform unit control unit 53 controls operation of the reform unit 20 so as to open the catalyst supply path 41 when it is determined by the reform determination unit 55 that the reforming is needed. While the reform unit control unit 53 controls operation of the reform unit 20 so as to close the catalyst supply path 41 when it is determined by the reform determination unit 55 that the reforming is not needed. This makes it possible to switch on and off the reforming, with a simple configuration for switching the opening and closing of the catalyst supply path 41.

(6) The cylinder pressure sensor 12 detects the cylinder pressure in the combustion chamber 10. The ignition timing ti can be specified as a crank angle based on the compression top dead center TDC, for example, based on the in-cylinder pressure detected by the in-cylinder pressure sensor 12. The actual ignitability of the reformed fuel can be evaluated based on the ignition timing ti.

According to the above embodiment, the example in which the ignition timing ti is specified based on the detection value of the in-cylinder pressure sensor 12 has been described; however, the ignition timing detection unit that detects the ignition timing of the fuel in the combustion chamber is not limited to such a unit. In addition, the specific octane number of the fuel and the concentrations of the peroxide and the oxide in the reformed fuel have been described as an example of the threshold value for evaluating whether the ignitability of the fuel is suitable for compression ignition; however, each threshold value is not limited thereto.

According to the above embodiment, the example in which the fuel reform apparatus is applied to the engine 1 mounted on a vehicle (FFV) has been described. However, the internal combustion engine is not limited to an in-vehicle engine, and may be mounted on a product such as a generator or a work machine.

The above embodiment can be combined as desired with one or more of the above modifications. The modifications can also be combined with one another.

According to the present invention, both low octane gasoline and regular octane gasoline can be compression ignited.

Above, while the present invention has been described with reference to the preferred embodiments thereof, it will be understood, by those skilled in the art, that various changes and modifications may be made thereto without departing from the scope of the appended claims.

What is claimed is:

1. A fuel reform apparatus, comprising:
    an internal combustion engine including an injector configured to inject fuel supplied from a fuel tank into a combustion chamber and configured so that compression-ignition combustion is carried out in the combustion chamber;
    a reform unit interposed in a fuel supply path from the fuel tank to the injector and including a reformer configured to reform fuel stored in the fuel tank by oxidation reaction;
    an ignition timing detector configured to detect an ignition timing of fuel in the combustion chamber; and
    a controller including a CPU and a memory connected to the CPU, wherein the controller is configured to perform:
        determining whether fuel has been supplied into the fuel tank;
        determining whether a reforming is needed based on the ignition timing detected by the ignition timing detector when it is determined that fuel has been supplied into the fuel tank;
        controlling operation of the reform unit so as to reform fuel stored in the fuel tank by the reformer to supply to the injector when it is determined that the reforming is needed; and
        controlling operation of the reform unit so as to supply fuel stored in the fuel tank to the injector without reforming by the reformer when it is determined that the reforming is not needed.

2. The fuel reform apparatus according to claim 1, wherein
    the fuel supply path includes:
        a first path passing through the reformer; and
        a second path bypassing the reformer, wherein
    the reform unit further includes:
        a fuel supply path switching unit configured to switch the fuel supply path between the first path and the second path, wherein
    the controller controls operation of the reform unit so as to switch the fuel supply path to the first path when it is determined that the reforming is needed, while controls operation of the reform unit so as to switch the fuel supply path to the second path when it is determined that the reforming is not needed.

3. The fuel reform apparatus according to claim 1, wherein
    the reform unit includes:
        a reform switching unit configured to activate and inactivate the reforming by the reformer, wherein
    the controller controls operation of the reform unit so as to activate the reforming by the reformer when it is determined that the reforming is needed, while controls operation of the reform unit so as to inactivate the reforming by the reformer when it is determined that the reforming is not needed.

4. The fuel reform apparatus according to claim 3, wherein
    the reform unit includes an on-off valve configured to open and close an air supply path supplying air to the reformer, as the reform switching unit, wherein
    the controller controls operation of the reform unit so as to open the air supply path when it is determined that the reforming is needed, while controls operation of the reform unit so as to close the air supply path when it is determined that the reforming is not needed.

5. The fuel reform apparatus according to claim 4, wherein
    the oxidation reaction of fuel in the reformer is catalytic reaction proceeding in presence of a catalyst, wherein
    the reform unit further includes:
        a catalyst tank configured to store the catalyst; and
        an on-off valve configured to open and close a catalyst supply path from the catalyst tank to the reformer, as the reform switching unit, wherein
    the controller controls operation of the reform unit so as to open the catalyst supply path when it is determined that the reforming is needed, while controls operation of the reform unit so as to close the catalyst supply path when it is determined that the reforming is not needed.

6. The fuel reform apparatus according to claim 1, wherein
    the ignition timing detector is a cylinder pressure sensor configured to detect a cylinder pressure in the combustion chamber.

7. A fuel reform apparatus, comprising:
    an internal combustion engine including an injector configured to inject fuel supplied from a fuel tank into a combustion chamber and configured so that compression-ignition combustion is carried out in the combustion chamber;

a reform unit interposed in a fuel supply path from the fuel tank to the injector and including a reformer configured to reform fuel stored in the fuel tank by oxidation reaction;

an ignition timing detector configured to detect an ignition timing of fuel in the combustion chamber; and a controller including a CPU and a memory connected to the CPU, wherein the controller is configured to function as:

a reform control unit configured to control operation of the reform unit;

a fuel supply determination unit configured to determine whether fuel has been supplied into the fuel tank; and a reform determination unit configured to determine whether a reforming is needed based on the ignition timing detected by the ignition timing detector when it is determined by the fuel supply determination unit that fuel has been supplied into the fuel tank, wherein the reform control unit controls operation of the reform unit so as to reform fuel stored in the fuel tank by the reformer to supply to the injector when it is determined by the reform determination unit that the reforming is needed; while controls operation of the reform unit so as to supply fuel stored in the fuel tank to the injector without reforming by the reformer when it is determined by the reform determination unit that the reforming is not needed.

8. The fuel reform apparatus according to claim 7, wherein the fuel supply path includes:
a first path passing through the reformer; and
a second path bypassing the reformer, wherein the reform unit further includes:
a fuel supply path switching unit configured to switch the fuel supply path between the first path and the second path, wherein the reform control unit controls operation of the reform unit so as to switch the fuel supply path to the first path when it is determined by the reform determination unit that the reforming is needed, while controls operation of the reform unit so as to switch the fuel supply path to the second path when it is determined by the reform determination unit that the reforming is not needed.

9. The fuel reform apparatus according to claim 7, wherein the reform unit includes:
a reform switching unit configured to activate and inactivate the reforming by the reformer, wherein the reform control unit controls operation of the reform unit so as to activate the reforming by the reformer when it is determined by the reform determination unit that the reforming is needed, while controls operation of the reform unit so as to inactivate the reforming by the reformer when it is determined by the reform determination unit that the reforming is not needed.

10. The fuel reform apparatus according to claim 9, wherein the reform unit includes an on-off valve configured to open and close an air supply path supplying air to the reformer, as the reform switching unit, wherein the reform control unit controls operation of the reform unit so as to open the air supply path when it is determined by the reform determination unit that the reforming is needed, while controls operation of the reform unit so as to close the air supply path when it is determined by the reform determination unit that the reforming is not needed.

11. The fuel reform apparatus according to claim 10, wherein the oxidation reaction of fuel in the reformer is catalytic reaction proceeding in presence of a catalyst, wherein the reform unit further includes:
a catalyst tank configured to store the catalyst; and
an on-off valve configured to open and close a catalyst supply path from the catalyst tank to the reformer, as the reform switching unit, wherein the reform control unit controls operation of the reform unit so as to open the catalyst supply path when it is determined by the reform determination unit that the reforming is needed, while controls operation of the reform unit so as to close the catalyst supply path when it is determined by the reform determination unit that the reforming is not needed.

12. The fuel reform apparatus according to claim 7, wherein the ignition timing detector is a cylinder pressure sensor configured to detect a cylinder pressure in the combustion chamber.

* * * * *